(12) United States Patent
Gayon et al.

(10) Patent No.: US 11,285,850 B2
(45) Date of Patent: Mar. 29, 2022

(54) ARMREST MODULE WITH HUMAN-MACHINE INTERFACE FOR VEHICLE SEAT

(71) Applicant: Faurecia Interieur Industrie, Nanterre (FR)

(72) Inventors: David Gayon, L'Isle-Adam (FR); Cedric Caravano, Saint Germain en Laye (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 290 days.

(21) Appl. No.: 16/125,123

(22) Filed: Sep. 7, 2018

(65) Prior Publication Data
US 2019/0077288 A1    Mar. 14, 2019

(30) Foreign Application Priority Data

Sep. 8, 2017   (FR) ...................... 17 58322

(51) Int. Cl.
*B60N 2/75*   (2018.01)
*B60R 11/00*  (2006.01)
*B60N 2/02*   (2006.01)

(52) U.S. Cl.
CPC ............. *B60N 2/797* (2018.02); *B60N 2/767* (2018.02); *B60N 2/773* (2018.02); *B60N 2002/022* (2013.01); *B60R 2011/001* (2013.01); *B60R 2011/0014* (2013.01); *B60R 2011/0082* (2013.01); *B60R 2011/0084* (2013.01)

(58) Field of Classification Search
CPC ......... B60N 2/797; B60N 2/767; B60N 2/773

USPC ...................................................... 297/217.3
See application file for complete search history.

(56) References Cited

U.S. PATENT DOCUMENTS

| 7,520,567 | B2* | 4/2009 | Billger | B60N 2/797 |
| | | | | 297/217.3 |
| 7,604,291 | B2* | 10/2009 | Vitito | B60R 11/0211 |
| | | | | 297/217.3 X |
| 8,398,023 | B2* | 3/2013 | N nez | B64D 43/00 |
| | | | | 297/217.3 |
| 2006/0255642 | A1 | 11/2006 | Epaud | |

(Continued)

FOREIGN PATENT DOCUMENTS

CA    2613069 A1    6/2008
DE    19823860 A1   12/1999
(Continued)

OTHER PUBLICATIONS

French Search Report in French with English translation corresponding to French application No. FR 1758322, dated Apr. 27, 2018, 13 pages.

(Continued)

*Primary Examiner* — Anthony D Barfield
(74) *Attorney, Agent, or Firm* — Reising Ethington P.C.

(57) ABSTRACT

An armrest module for a motor vehicle. The armrest module includes an armrest arm able to support the arm of an occupant of the motor vehicle, the armrest arm extending primarily in a longitudinal direction (X); a pad, the pad being pivotable relative to the armrest arm about two axes (A1, A2) which are perpendicular to each other, the two axes (A1, A2) also being perpendicular to the longitudinal direction (X) of the armrest arm; and a human-machine interface provided by the pad.

20 Claims, 3 Drawing Sheets

(56) References Cited

U.S. PATENT DOCUMENTS

| | | | |
|---|---|---|---|
| 2015/0203006 A1* | 7/2015 | Hipshier | ............... B60N 2/773 296/153 |
| 2017/0349069 A1 | 12/2017 | Hélot | |
| 2018/0304789 A1* | 10/2018 | Robert | .................... B60N 2/77 |

FOREIGN PATENT DOCUMENTS

| | | | | |
|---|---|---|---|---|
| DE | 102005043890 A1 | 3/2007 | | |
| DE | 102006018537 A1 | 8/2007 | | |
| DE | 102014019125 A1 | 6/2016 | | |
| EP | 0911548 A2 | 4/1999 | | |
| EP | 3023297 A1 | 5/2016 | | |
| EP | 3023297 B1 * | 5/2019 | .............. | B60N 2/77 |
| FR | 2698594 A1 | 6/1994 | | |
| FR | 2698596 A1 | 6/1994 | | |
| GB | 2458283 A | 9/2009 | | |
| KR | 101447374 B1 | 10/2014 | | |
| KR | 101696593 B1 | 1/2017 | | |

OTHER PUBLICATIONS

Chinese Office Action corresponding to Chinese Application No. 201811041411, translated into English, dated Jan. 4, 2022, 15 pages.

\* cited by examiner

ARMREST MODULE WITH HUMAN-MACHINE INTERFACE FOR VEHICLE SEAT

TECHNICAL FIELD

The present invention relates to an armrest module for a motor vehicle seat with a human-machine interface, and a seat, console, and door of a motor vehicle which are provided with such an armrest module.

PRIOR ART

In the automotive field, a vehicle seat is known comprising a seat portion and a backrest, the backrest being mounted so as to pivot relative to the seat portion about an axis extending transversely relative to the seat.

It is known to provide this type of vehicle seat with an armrest allowing a seat occupant to rest his or her arm on the armrest. At its end, the armrest may have a human-machine interface such as buttons for controlling the position of the seat, particularly the relative position of the backrest relative to the seat portion.

Such an armrest generally has a low degree of positional adjustment. Most often, the armrest is simply mounted on the backrest and is pivotable about an axis extending transversely relative to the seat.

This simple rotation does not ensure the comfort of the occupant of the vehicle seat nor easy access to the human-machine interface in all adjustment positions of the armrest.

SUMMARY OF THE INVENTION

An object of the present invention is therefore to provide an armrest module for a motor vehicle seat which facilitates access to the human-machine interface of the armrest.

This object of the invention may be achieved by means of an armrest module for a vehicle, particularly for a motor vehicle, in particular intended to be fixed on a vehicle seat, on a motor vehicle console, or on a motor vehicle door, comprising:

an armrest arm able to support the arm of an occupant of the vehicle, in particular the arm of an occupant of the vehicle seat, the armrest arm extending primarily in a longitudinal direction, a pad at one end of the armrest arm, the pad being pivotable about two axes that are perpendicular to each other, the two axes also being perpendicular to the longitudinal direction of the armrest arm; and a human-machine interface supported by the pad.

Thus, advantageously, the armrest module according to the invention allows greater variety in the adjustments to the position of the human-machine interface than armrests of the prior art, which allows better adaptation to the occupant of the vehicle seat.

According to preferred embodiments, the armrest module according to the invention has one or more of the following features, alone or in combination:

- the human-machine interface comprises one or more buttons and/or one or more screens, in particular touch screens, and/or one or more joysticks;
- the pad is able to be moved relative to the armrest arm along said longitudinal direction;
- the pad is shaped to be received in the armrest arm or under the armrest arm, preferably by translational movement in the longitudinal direction;
- the pad is fixed to a connecting rod so as to pivot about two axes which are perpendicular to each other, the rod preferably being mounted to move freely in translation relative to the armrest arm;
- the armrest arm forms a housing for receiving the connecting rod, and preferably the pad; and
- the human-machine interface is adapted to control at least one among:
  - a car radio of the vehicle;
  - ventilation of the vehicle;
  - climate controls of the vehicle;
  - interior lighting of the vehicle;
  - a position of a vehicle seat;
  - a smartphone.

The invention also relates to a vehicle seat, particularly of a motor vehicle, comprising a seat portion with a seat portion frame and/or a backrest with a backrest frame, and an armrest module as described above in any of its combinations, fixed to the seat portion frame or backrest frame, the armrest module preferably being fixed on one side of the vehicle seat intended to be oriented towards the interior of the vehicle.

The backrest frame may be mounted so as to pivot relative to the seat portion frame, about a transverse axis of the vehicle seat.

The seat portion frame may comprise feet and rails such that the position of the feet in the rails can be changed by translational movement and/or the height of the feet is adjustable.

According to another aspect, the invention relates to a vehicle console, particularly of a motor vehicle, comprising an armrest module as described above in any of its combinations.

Finally, according to yet another aspect, the invention relates to a vehicle door, particularly of a motor vehicle, to which is fixed an armrest module as described above in any of its combinations.

BRIEF DESCRIPTION OF DRAWINGS

Other features, objects, and advantages of the invention will be apparent from reading the following description, which refers to the accompanying drawings in which.

DETAILED DESCRIPTION

Figure 1:
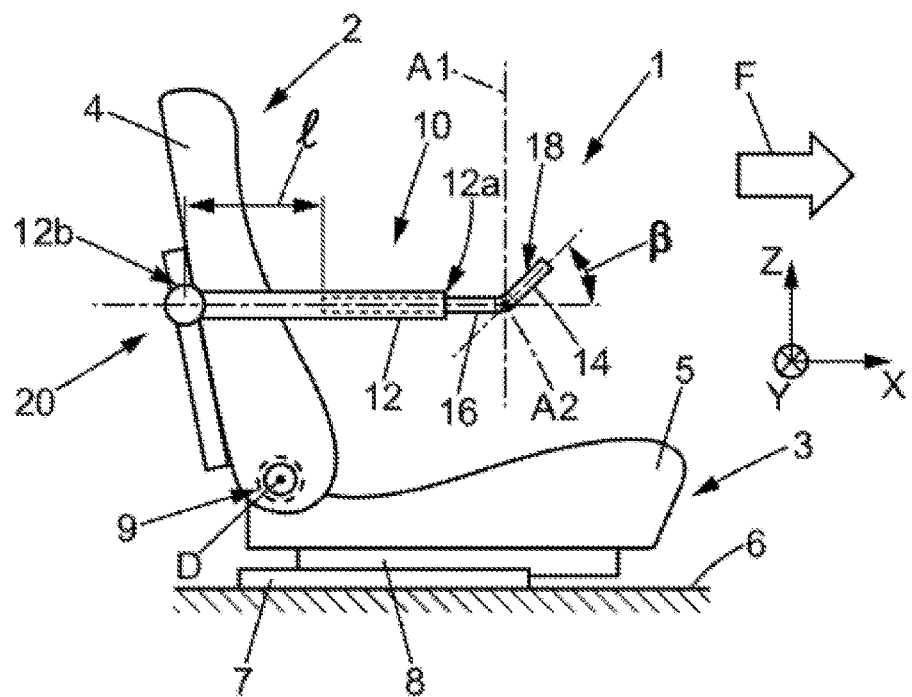
FIG. 1 schematically represents a side view of an exemplary vehicle seat equipped with an armrest module.

FIGS. 1 to 5 illustrate an example of a seat 1 of a motor vehicle. Preferably, the motor vehicle is an autonomous vehicle. The seat 1 comprises a backrest 2 and a seat portion 3. The backrest 2 comprises a backrest frame 4. The seat portion 3 comprises a seat portion frame 5. The backrest frame 4 is mounted on the seat portion frame 5 substantially in a pivoting connection about an axis D. The seat portion frame 5 may itself be mounted on the floor 6 of the motor vehicle, for example by means of rails 7 of the seat 1. In the current case, the seat portion frame 5 has feet 8 which are received in the rails 7, such that the position of the feet 8 in the rails 7 can be modified by translational movement along the longitudinal direction X of the seat, corresponding here to the normal direction of advancement F of the motor vehicle. The position of the seat 1 relative to the steering wheel of the motor vehicle can thus be adjusted in a longitudinal direction X of the motor vehicle seat corresponding to the direction F of advancement of the motor vehicle during normal operation. The height of the feet 8 may also be adjustable.

A hinge device 9 here enables adjusting the angle of the backrest frame 4 relative to the seat portion frame 5 and locking the angle of the backrest frame 4. Such a hinge device 9 is well known to those skilled in the art. For the sake of brevity in the present description, this hinge device 9 is therefore not described in more detail here.

In addition, in the figures the seat 1 is provided with an armrest module 10.

Such an armrest module 10 firstly comprises an armrest arm 12 intended to support the arm of an occupant of the motor vehicle seat 1. The armrest arm extends primarily in a longitudinal direction X, here corresponding to the normal direction of advancement F of the motor vehicle.

The armrest arm 12 may be mounted so as to pivot about a direction Y that is transverse to the backrest frame 4 of the motor vehicle seat 1. This enables folding down the armrest arm 12 into a position where it extends substantially as an extension of the backrest 2 of the seat 1, thereby reducing the space occupied by the armrest arm 12. This is of particular interest when the armrest is mounted on the side of the motor vehicle seat 1 which is towards the exterior of the motor vehicle, to enable the entry of the seat occupant into the motor vehicle. However, preferably, the seat module 10 described here is mounted on the side of the motor vehicle seat 1 which is towards the interior of the motor vehicle (especially to the right on the driver's seat of a motor vehicle which has the steering wheel on the left). It is then unnecessary to fold the armrest arm up or down every time the occupant wishes to exit the motor vehicle seat 1.

The armrest arm 12 may also be mounted so that it can be moved in translation relative to the backrest frame 4, along a substantially vertical direction. It is thus possible to adjust the height of the armrest arm 12, independently of its angular position relative to the backrest frame 4. The angular position of the armrest arm 12 relative to the backrest frame 4 is also called the pitch.

To allow adjusting the pitch and/or the height of the armrest arm 12, the armrest module 10 and/or the motor vehicle seat 1 may comprise a device 20 for adjusting the height of the armrest arm 12 and/or the pitch of the armrest arm 12.

At the distal end 12a of the armrest arm 12, which is the end opposite the proximal end 12b fixed to the backrest frame 4, the armrest module 10 comprises a pad 14 mounted on a connecting rod 16. The pad 14 supports a human-machine interface 18. The distal end 12a of the armrest arm 12 is the end intended to be facing the hand of the vehicle occupant. The proximal end 12b of the armrest arm 12 is the end intended to support the elbow of the vehicle occupant.

The human-machine interface 18 may take different forms. In particular, the human-machine interface may comprise one or more screens, in particular one or more touch screens, and/or one or more control buttons, in particular one or more push buttons, and/or one or more joysticks. The human-machine interface thus enables controlling many elements of the motor vehicle. This human-machine interface 18 may in particular comprise controls for:

adjusting the position of the seat 1, particularly the position of the feet 8 in the rails 7, the height of the feet 8, the reclining angle of the backrest frame 4 relative to the seat portion frame 5 about the D axis;

adjusting the position of the armrest module 10 relative to the motor vehicle seat 1, particularly when this position is adjusted by means of controllable actuators;

adjusting any other parameter in the motor vehicle, such as adjusting the car radio, a satellite-based radio navigation system, especially the GPS, the position of the outside mirrors, the rear view mirror, the position of the steering wheel relative to the dashboard, the air conditioning and/or ventilation in the passenger compartment;

controlling the interior lighting of the motor vehicle, in particular an overhead light and/or a reading light;

motor vehicle controls such as centralized locking of the doors, turning on the hazard lights;

or any other control accessible to those skilled in the art.

The human-machine interface may also allow connecting with a smartphone, in particular by making use of a Mirrorlink® type of technology, preferably the MirrorLink® technology. A smartphone may thus be used, via the human-machine interface 18, to manage some or all of the controls mentioned above. Additionally or alternatively, the human-machine interface 18 may be used to manage at least some controls of the smartphone. For example, the human-machine interface allows:

entering a phone number and calling it;

navigating the contacts database stored in the memory of the smartphone or its SIM card in order to call one of the contacts;

writing an SMS message, MMS message, or email;

opening, and advantageously reading by means of the audio and/or video devices of the motor vehicle, an SMS, MMS, or email message received; and playing songs and/or videos saved in the smartphone memory or which the smartphone can access, in particular via a wireless connection, using the audio and/or video devices of the motor vehicle.

According to a particularly advantageous example, the armrest module 10, for example the armrest arm 12, forms a housing to receive a smartphone and comprises means for electrically recharging the smartphone, for example a socket, in particular a USB socket, and/or means for the wireless transmission of electrical energy to the smartphone. The human-machine interface can then comprise at least one communication means intended for communicating with the smartphone, in particular a communication means using WiFi or Near Field Communication (NFC) technology, or Bluetooth® technology.

It is noteworthy that the pad 14 is mounted so as to pivot relative to the connecting rod 18, about two axes A1, A2 perpendicular to each other, the two axes A1, A2 also being perpendicular to the longitudinal direction X of extension of the armrest arm 12. Regarding the two axes A1, A2 perpendicular to each other, one may be substantially horizontal and the other substantially vertical.

Rotation of the pad 14 relative to the rod 16 about these two axes A1, A2, allows a wide variety in the adjustments to the orientation of the pad 14, and thus to the human-machine interface 18. It is thus possible for the human-machine interface 18 to face the occupant of the motor vehicle seat such that the human-machine interface 18 is always visible and/or accessible to the occupant of the motor vehicle seat.

Figure 2:
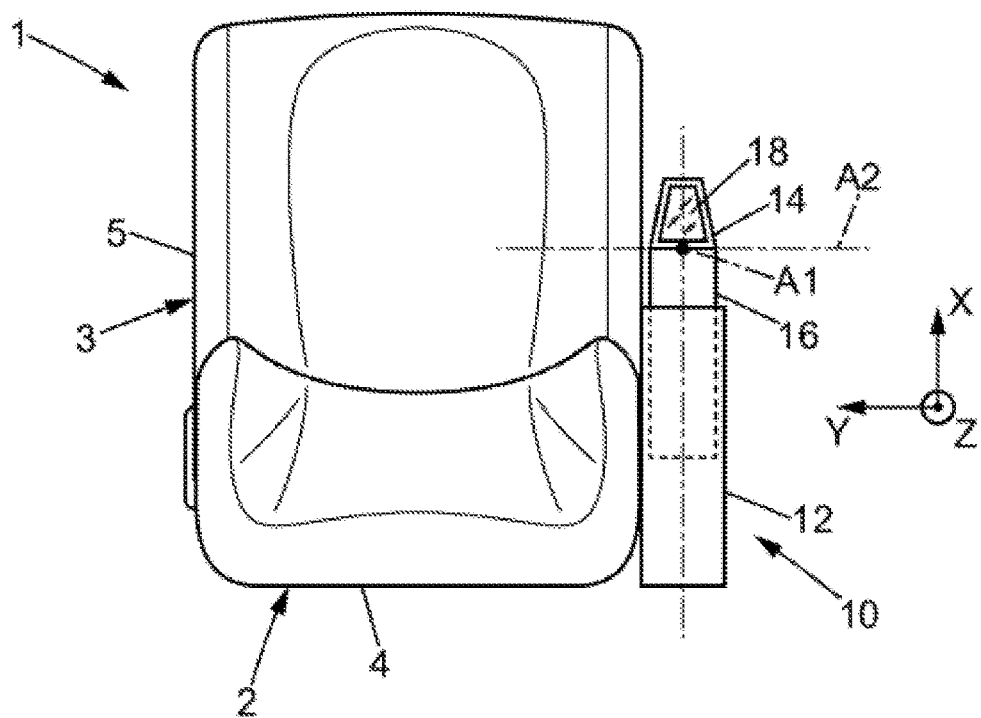
FIG. 2 schematically represents a top view of the vehicle seat of FIG. 1.
Figure 4:
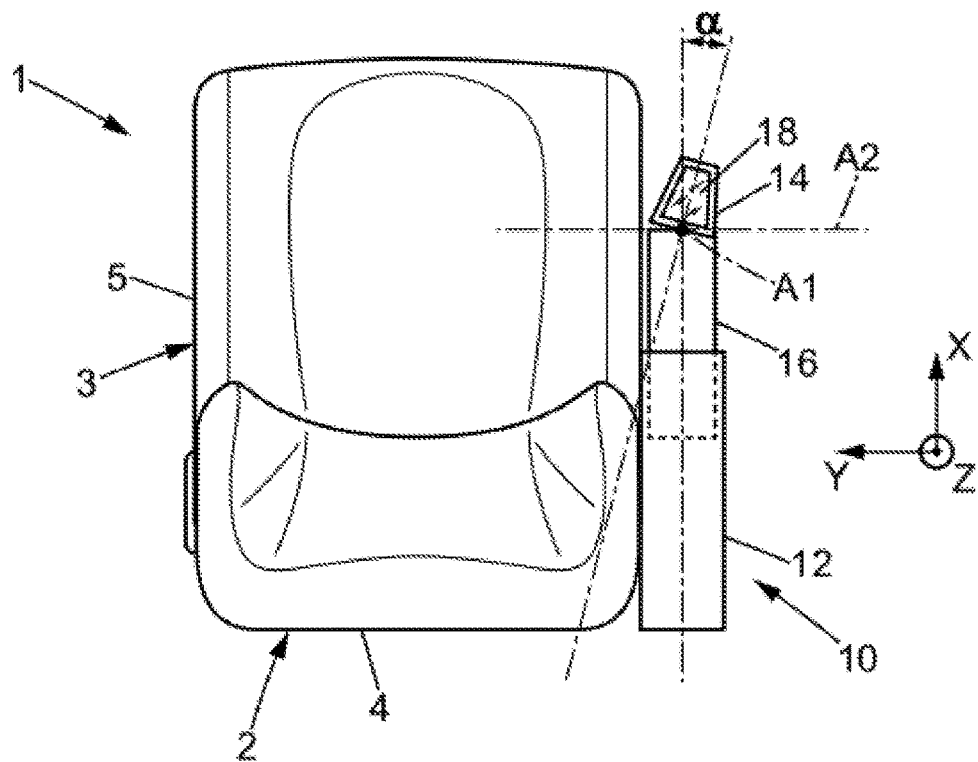
FIG. 4 is a view similar to FIG. 2, of the seat of FIG. 3.

Here, more particularly, the rotation about the substantially vertical axis A1 makes it possible to vary the angle α of rotation of the pad 14 relative to the connecting rod 16, towards the inside or towards the outside of the motor vehicle, as illustrated by a comparison of FIGS. 2 and 4.

Figure 3:
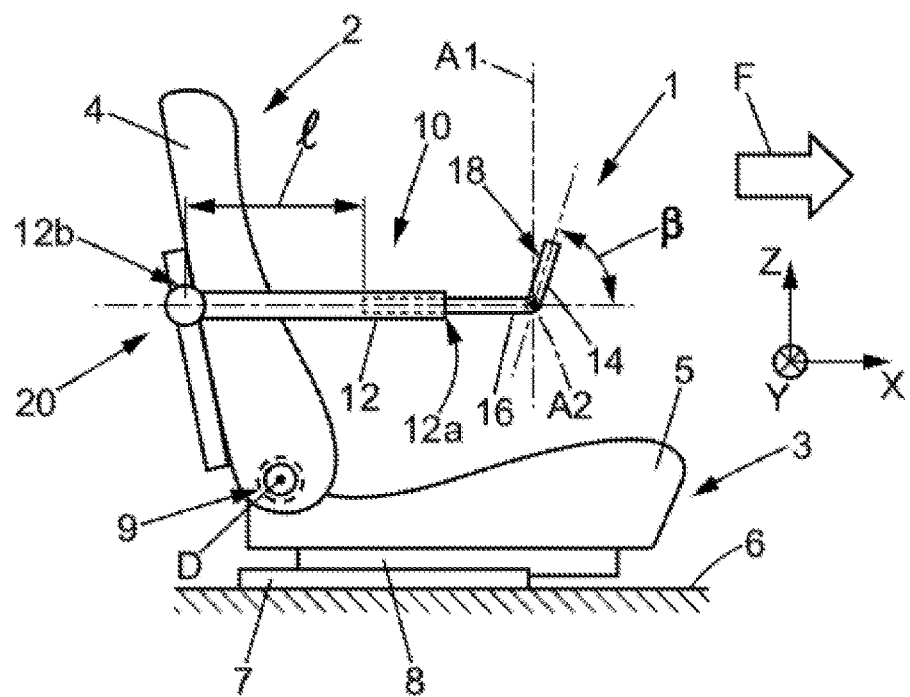
FIG. 3 is a view similar to FIG. 1, of the seat in another position.

Rotation about the substantially horizontal axis A2 makes it possible to vary the angle β of the pad upwards or downwards, as illustrated by a comparison of FIGS. 1 and 3.

To further improve the adjustment possibilities for the position of the human-machine interface 18, the connecting rod 16 is movable in translation relative to the armrest arm 12, along the longitudinal direction X of the armrest arm. For example, the connecting rod 16 is slidably mounted in a rail formed in the armrest arm 12 or under the armrest arm 12. This allows the possibility, in particular when the pad 14 extends as the extension of the connecting rod 16 along the longitudinal direction X, of storing the pad 14, and advantageously the rod 16, in a housing formed in the armrest arm or under the armrest arm, in order to reduce the space occupied by the armrest module 10. This retracted configuration of the armrest module 10, or storage configuration, is shown in FIG. 5.

It should be noted here that "connecting rod" is understood to mean any rigid mechanical part suitable for connecting two other mechanical parts such that the two other mechanical parts are movable relative to each other. A connecting rod may in particular have, or consist of, a portion extending in a main direction of extension, between two ends. The rod may in particular be substantially flat. The connecting rod preferably has fixed dimensions.

Figure 5:
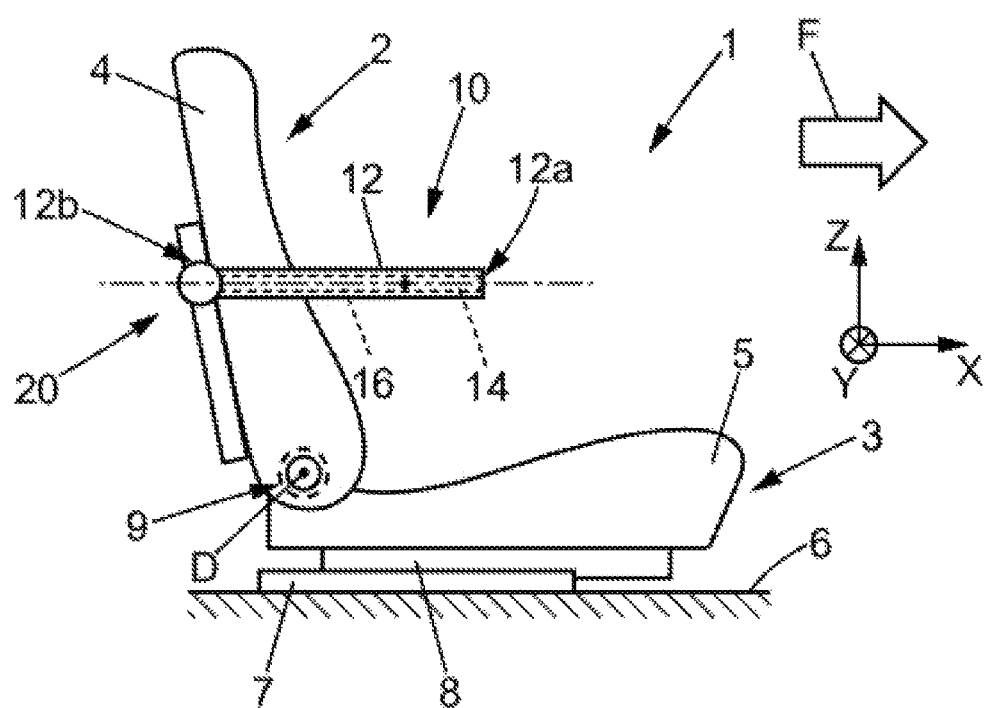
FIG. 5 is a view similar to FIGS. 1 and 3, of the seat with the armrest arm in a retracted position.

Movement of the connecting rod 16 relative to the armrest arm 12 may in particular be measured by the length l between the proximal end of the connecting rod 16 and the position of this proximal end, when the assembly of connecting rod 16 and pad 14 is in its retracted position in the armrest arm 12 or under the armrest arm 12, a retracted position which is illustrated in FIG. 5.

The present invention is not limited to the single embodiment that has just been described, but is instead capable of numerous variants accessible to those skilled in the art.

First, the armrest module is not necessarily intended to be fixed on an individual motor vehicle seat. It may also be fixed to a seat shared by multiple occupants of the motor vehicle ("bench seat"), to a motor vehicle console, whether front or rear, or even to a motor vehicle door. A vehicle console may have a human-machine interface that is distinct from the human-machine interface carried by the armrest module. In particular, such a console traditionally comprises controls for adjusting the ventilation and/or climate controls, the audio and video devices of the motor vehicle, or even certain controls for the headlights of the motor vehicle, in particular a control to turn on the hazard lights. The armrest module then makes it possible to duplicate and/or remotely manage these controls and/or add other controls to the console.

Similarly, a door is generally provided with a human-machine interface which in particular allows controlling one or more window regulators and/or adjusting one or more outside mirrors. The armrest module then makes it possible to duplicate and/or remotely manage these controls and/or add other controls to the door.

The armrest module may also be fixed to the seat portion frame of the motor vehicle seat rather than to the backrest frame.

When the armrest module is fixed to a seat, door, or console, the pad of the armrest module is preferably located at the distal end of the armrest arm, meaning at the end that is intended to be facing the hand of the vehicle occupant.

The invention claimed is:

1. Armrest module for a vehicle, comprising:
   an armrest arm able to support the arm of an occupant of the vehicle, the armrest arm extending primarily in a longitudinal direction;
   a pad, the pad being pivotable relative to the armrest arm about two axes that are perpendicular to each other, the two axes also being perpendicular to the longitudinal direction of the armrest arm; and
   a human-machine interface supported by the pad,
   wherein the pad is able to be moved relative to the armrest arm along said longitudinal direction.

2. Armrest module according to claim 1, wherein the human-machine interface comprises at least one among:
   one or more buttons;
   one or more screens;
   one or more joysticks;
   one or more touch screens.

3. Armrest module according to claim 1, wherein the pad is shaped to be received in the armrest arm.

4. Armrest module according to claim 3, wherein the pad is shaped to be received in the armrest arm by translational movement in the longitudinal direction.

5. Armrest module according to claim 1, wherein the pad is shaped to be received under the armrest arm.

6. Armrest module according to claim 5, wherein the pad is shaped to be received under the armrest arm by translational movement in the longitudinal direction.

7. Armrest module according to claim 1, wherein the pad is fixed to a connecting rod so as to pivot about two axes which are perpendicular to each other.

8. Armrest module according to claim 7, wherein the connecting rod is mounted to move freely in translation relative to the armrest arm.

9. Armrest module according to claim 7, wherein the armrest arm forms a housing for receiving the connecting rod.

10. Armrest module according to claim 7, wherein the armrest arm forms a housing for receiving the connecting rod and the pad.

11. Armrest module according to claim 8, wherein the armrest arm forms a housing for receiving the connecting rod.

12. Armrest module according to claim 8, wherein the armrest arm forms a housing for receiving the connecting rod and the pad.

13. Armrest module according to claim 1, wherein the human-machine interface is adapted to control at least one among:
   a car radio of the vehicle;
   ventilation of the vehicle;
   climate controls of the vehicle;
   interior lighting of the vehicle;
   a position of a vehicle seat;
   a smartphone.

14. Vehicle seat comprising a seat portion with a seat portion frame and/or a backrest with a backrest frame, and an armrest module according to claim 1, fixed to the seat portion frame or backrest frame.

15. Vehicle console comprising an armrest module according to claim 1.

16. Vehicle door, to which is fixed an armrest module according to claim 1.

17. Armrest module for a vehicle, comprising:
an armrest arm able to support the arm of an occupant of the vehicle, the armrest arm extending primarily in a longitudinal direction;
a pad, the pad being pivotable relative to the armrest arm about two axes that are perpendicular to each other, the two axes also being perpendicular to the longitudinal direction of the armrest arm; and
a human-machine interface supported by the pad,
wherein the pad is fixed to a connecting rod so as to pivot about two axes which are perpendicular to each other with regard to the rod, wherein the pad is shaped to be received in or under the armrest arm.

18. Vehicle seat comprising a seat portion with a seat portion frame and/or a backrest with a backrest frame, and an armrest module according to claim 17, fixed to the seat portion frame or backrest frame.

19. Vehicle console comprising an armrest module according to claim 17.

20. Vehicle door, to which is fixed an armrest module according to claim 17.

* * * * *